(12) United States Patent
Mongillo, Jr. et al.

(10) Patent No.: US 11,459,898 B2
(45) Date of Patent: Oct. 4, 2022

(54) AIRFOIL COOLING HOLES

(71) Applicant: Raytheon Technologies Corporation, Farmington, CT (US)

(72) Inventors: Dominic J. Mongillo, Jr., West Hartford, CT (US); Atul Kohli, Tolland, CT (US); Jeffrey J. DeGray, Somers, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/245,208

(22) Filed: Apr. 30, 2021

(65) Prior Publication Data

US 2022/0018260 A1    Jan. 20, 2022

Related U.S. Application Data

(60) Provisional application No. 63/053,678, filed on Jul. 19, 2020.

(51) Int. Cl.
*F01D 5/18* (2006.01)
*F01D 25/12* (2006.01)

(52) U.S. Cl.
CPC ............. *F01D 5/186* (2013.01); *F01D 25/12* (2013.01); *F05D 2220/32* (2013.01); *F05D 2240/12* (2013.01); *F05D 2240/30* (2013.01); *F05D 2260/202* (2013.01)

(58) Field of Classification Search
CPC ........................... F01D 5/186; F05D 2260/202
See application file for complete search history.

(56) References Cited

U.S. PATENT DOCUMENTS

| 7,997,868 | B1 * | 8/2011 | Liang ....................... F01D 5/186 416/97 R |
| 8,057,181 | B1 * | 11/2011 | Liang ....................... F01D 5/186 416/97 R |
| 8,683,813 | B2 | 4/2014 | Xu et al. |
| 9,598,979 | B2 * | 3/2017 | Reed ....................... F01D 25/12 |
| 10,215,030 | B2 | 2/2019 | Xu |
| 10,422,230 | B2 | 9/2019 | Lewis et al. |
| 10,605,092 | B2 | 3/2020 | Xu |

(Continued)

OTHER PUBLICATIONS

European Search Report for European Application No. 21186511.8, dated Jan. 4, 2022, 10 pages.

*Primary Examiner* — Eldon T Brockman
(74) *Attorney, Agent, or Firm* — Cantor Colburn LLP

(57) ABSTRACT

Component for gas turbine engines are described. The components include a component wall having an inner wall surface and an outer wall surface and a cooling hole formed within the component wall. The cooling hole has an inlet formed in the inner wall surface and an outlet formed in the outer wall surface and defines a fluid path through the component wall. The cooling hole has a metering section extending from the inlet to a transition point and a diffusing section extending from the transition point to the outlet. The metering section is defined by a uniform geometry and the diffusing section is defined by a lobed portion that extends from the transition point toward the outlet. The lobed portion has a first lobe and a second lobe divided by a ridge surface and each lobe defines continuous curved surfaces along the length of the ridge surface.

20 Claims, 11 Drawing Sheets

(56) References Cited

U.S. PATENT DOCUMENTS

| | | | | |
|---|---|---|---|---|
| 2011/0293423 A1* | 12/2011 | Bunker | ............... | F01D 5/186 |
| | | | | 29/889 |
| 2013/0205794 A1* | 8/2013 | Xu | ............... | F01D 9/065 |
| | | | | 60/754 |
| 2013/0206739 A1* | 8/2013 | Reed | ............... | F23R 3/002 |
| | | | | 219/121.71 |
| 2018/0274370 A1* | 9/2018 | Bunker | ............... | F01D 5/186 |

\* cited by examiner

AIRFOIL COOLING HOLES

CROSS-REFERENCE TO RELATED APPLICATIONS

This application claims the benefit of U.S. Provisional Application Ser. No. 63/053,678, filed Jul. 19, 2020, the disclosure of which is incorporated herein by reference in its entirety.

BACKGROUND

The subject matter disclosed herein generally relates to gas turbine engines and, more particularly, to cooling scheme and cooling holes of airfoil of gas turbine engines.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low-pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines may utilize two-spool configurations, with a corresponding number of coaxially rotating turbine and compressor sections. In two-spool designs, the high-pressure turbine drives a high-pressure compressor, forming the high-pressure spool or high spool. The low-pressure turbine drives the low spool and fan section, or a shaft for a rotor or propeller. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

BRIEF SUMMARY

According to some embodiments, airfoils and other components of gas turbine engines are described. The components include a hot wall structure having cooling holes passing therethrough. The cooling holes have specific features, geometries, and aspects that provide improved cooling to such components.

According to some embodiments, components for gas turbine engines are provided. The components include a component wall having an inner wall surface and an outer wall surface and a cooling hole formed within the component wall having an inlet formed in the inner wall surface and an outlet formed in the outer wall surface, wherein the cooling hole defines a fluid path through the component wall from the inlet to the outlet. The cooling hole has a metering section extending from the inlet to a transition point and a diffusing section extending from the transition point to the outlet. The metering section is defined by a uniform geometry and the diffusing section is defined by a lobed portion that extends from the transition point toward the outlet, the lobed portion having a first lobe and a second lobe divided by a ridge surface, with each lobe defining continuous curved surfaces along the length of the ridge surface.

In addition to one or more of the features described herein, or as an alternative, further embodiments of the components may include that the diffusing section further comprises a flat portion at an end of the ridge surface, wherein each lobe transitions from a curved surface to the flat portion.

In addition to one or more of the features described herein, or as an alternative, further embodiments of the components may include that the ridge surface has a first surface extending at a first downstream diffusing angle relative to a centerline defined by the metering section and a second surface extending at a second downstream diffusing angle relative to the centerline, wherein the first surface extends from the transition point to a ridge surface inflection point and the second surface extends from the ridge surface inflection point toward the outlet.

In addition to one or more of the features described herein, or as an alternative, further embodiments of the components may include that the second downstream diffusing angle is greater than the first downstream diffusing angle.

In addition to one or more of the features described herein, or as an alternative, further embodiments of the components may include that the first downstream diffusing angle is between 5° and 15°.

In addition to one or more of the features described herein, or as an alternative, further embodiments of the components may include that the second downstream diffusing angle is between 15° and 30°.

In addition to one or more of the features described herein, or as an alternative, further embodiments of the components may include that an upstream diffusing surface of the diffusing section angles away from a centerline defined by the metering section at an upstream diffusing angle.

In addition to one or more of the features described herein, or as an alternative, further embodiments of the components may include that the upstream diffusing angle is between 1° and 5°.

In addition to one or more of the features described herein, or as an alternative, further embodiments of the components may include that the diffusing section includes a covered region and an uncovered region.

In addition to one or more of the features described herein, or as an alternative, further embodiments of the components may include that the covered region includes a fully covered sub-section and a partially covered sub-section, wherein the fully covered sub-section extends from the transition point to an upstream edge of the outlet.

In addition to one or more of the features described herein, or as an alternative, further embodiments of the components may include a plurality of additional cooling holes arranged in an array of cooling holes.

In addition to one or more of the features described herein, or as an alternative, further embodiments of the components may include that the metering section defines a hole centerline angled at a centerline angle of between 20° and 40°.

In addition to one or more of the features described herein, or as an alternative, further embodiments of the components may include that the component wall is one of a pressure side wall and a suction side wall of an airfoil.

In addition to one or more of the features described herein, or as an alternative, further embodiments of the components may include that the component wall is a platform of a turbine blade.

In addition to one or more of the features described herein, or as an alternative, further embodiments of the components may include that the component wall is a platform of a turbine vane.

According to some embodiments, gas turbine engines are provided. The gas turbine engines include a compressor section and a turbine section. At least one of the compressor section and the turbine section comprise an airfoil having an airfoil wall having an inner wall surface and an outer wall surface and a cooling hole formed within the airfoil wall having an inlet formed in the inner wall surface and an outlet formed in the outer wall surface, wherein the cooling hole defines a fluid path through the airfoil wall from the inlet to the outlet, wherein the cooling hole has a metering section extending from the inlet to a transition point and a diffusing section extending from the transition point to the outlet. The metering section is defined by a uniform geometry and the diffusing section is defined by a lobed portion that extends from the transition point toward the outlet, the lobed portion having a first lobe and a second lobe divided by a ridge surface, and each lobe defines continuous curved surfaces along the length of the ridge surface.

In addition to one or more of the features described herein, or as an alternative, further embodiments of the gas turbine engines may include that the diffusing section further comprises a flat portion at an end of the ridge surface, wherein each lobe transitions from a curved surface to the flat portion.

In addition to one or more of the features described herein, or as an alternative, further embodiments of the gas turbine engines may include that the ridge surface has a first surface extending at a first downstream diffusing angle relative to a centerline defined by the metering section and a second surface extending at a second downstream diffusing angle relative to the centerline, wherein the first surface extends from the transition point to a ridge surface inflection point and the second surface extends from the ridge surface inflection point toward the outlet.

In addition to one or more of the features described herein, or as an alternative, further embodiments of the gas turbine engines may include that an upstream diffusing surface of the diffusing section angles away from a centerline defined by the metering section at an upstream diffusing angle.

In addition to one or more of the features described herein, or as an alternative, further embodiments of the gas turbine engines may include that the metering section defines a hole centerline angled at a centerline angle of between 20° and 40°.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE SEVERAL VIEWS OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
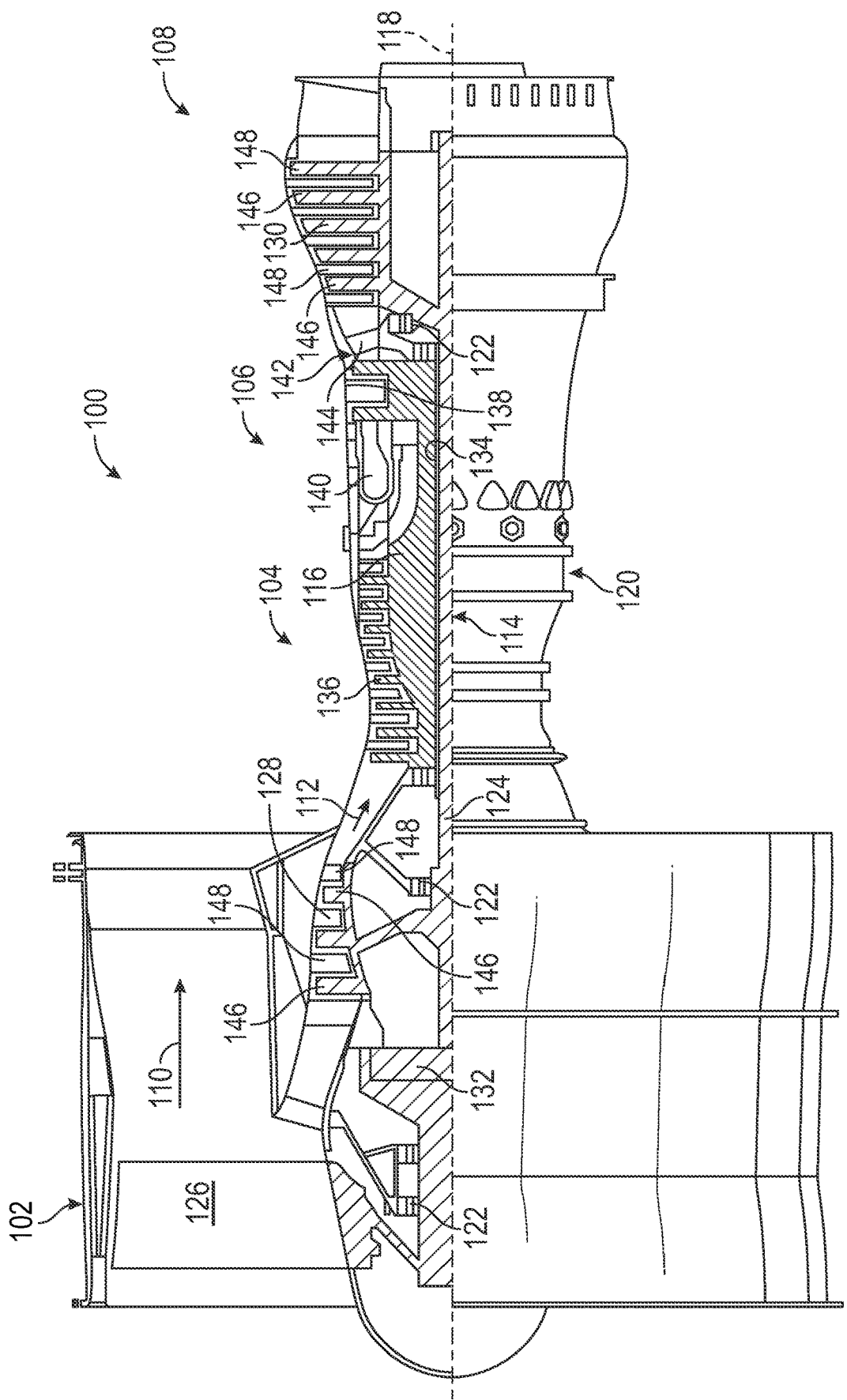
FIG. 1 is a schematic cross-sectional illustration of a gas turbine engine architecture that may employ various embodiments disclosed herein.

FIG. 1 schematically illustrates a gas turbine engine 100. The exemplary gas turbine engine 100 is a two-spool turbofan engine that generally incorporates a fan section 102, a compressor section 104, a combustor section 106, and a turbine section 108. The fan section 102 drives air along a bypass flow path 110, while the compressor section 104 drives air along a core flow path 112 for compression and communication into the combustor section 106. Hot combustion gases generated in the combustor section 106 are expanded through the turbine section 108. Although depicted as a turbofan gas turbine engine in the disclosed non-limiting embodiment, it should be understood that the concepts described herein are not limited to turbofan engines and these teachings could extend to other types of engines.

The gas turbine engine 100 generally includes a low speed spool 114 and a high-speed spool 116 mounted for rotation about an engine centerline longitudinal axis 118. The low speed spool 114 and the high-speed spool 116 may be mounted relative to an engine static structure 120 via several bearing systems 122. It should be understood that other bearing systems 122 may alternatively or additionally be provided.

The low speed spool 114 generally includes an inner shaft 124 that interconnects a fan 126, a low-pressure compressor 128 and a low-pressure turbine 130. The inner shaft 124 can be connected to the fan 126 through a geared architecture 132 to drive the fan 126 at a lower speed than the low speed spool 114. The high-speed spool 116 includes an outer shaft 134 that interconnects a high-pressure compressor 136 and a high-pressure turbine 138. In this embodiment, the inner shaft 124 and the outer shaft 134 are supported at various axial locations by bearing systems 122 positioned within the engine static structure 120.

A combustor 140 is arranged between the high-pressure compressor 136 and the high-pressure turbine 138. A mid-turbine frame 142 may be arranged generally between the high-pressure turbine 138 and the low-pressure turbine 130. The mid-turbine frame 142 can support one or more bearing systems 122 of the turbine section 108. The mid-turbine frame 142 may include one or more airfoils 144 that extend within the core flow path 112.

The inner shaft 124 and the outer shaft 134 are concentric and rotate via the bearing systems 122 about the engine centerline longitudinal axis 118, which is co-linear with their longitudinal axes. The core airflow is compressed by the low-pressure compressor 128 and the high-pressure compressor 136, is mixed with fuel and burned in the combustor 140 and is then expanded over the high-pressure turbine 138 and the low-pressure turbine 130. The high-pressure turbine 138 and the low-pressure turbine 130 rotationally drive the respective high-speed spool 116 and the low speed spool 114 in response to the expansion.

Each of the compressor section 104 and the turbine section 108 may include alternating rows of rotor assemblies and vane assemblies (shown schematically) that carry airfoils that extend into the core flow path 112. For example, the rotor assemblies can carry a plurality of rotating blades 146, while each vane assembly can carry a plurality of vanes 148 that extend into the core flow path 112. The blades 146 of the rotor assemblies add or extract energy from the core airflow that is communicated through the gas turbine engine 100 along the core flow path 112. The vanes 148 of the vane assemblies direct the core airflow to the blades 146 to either add or extract energy.

Various components of a gas turbine engine 100, including but not limited to the airfoils of the blades 146 and the vanes 148 of the compressor section 104 and the turbine section 108, may be subjected to repetitive thermal cycling under widely ranging temperatures and pressures. The hardware of the turbine section 108 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration, as the teachings may be applied to other types of engines such as, but not limited to, turbojets, turboshafts, and other turbofan configurations (e.g., wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT")).

Figure 2:
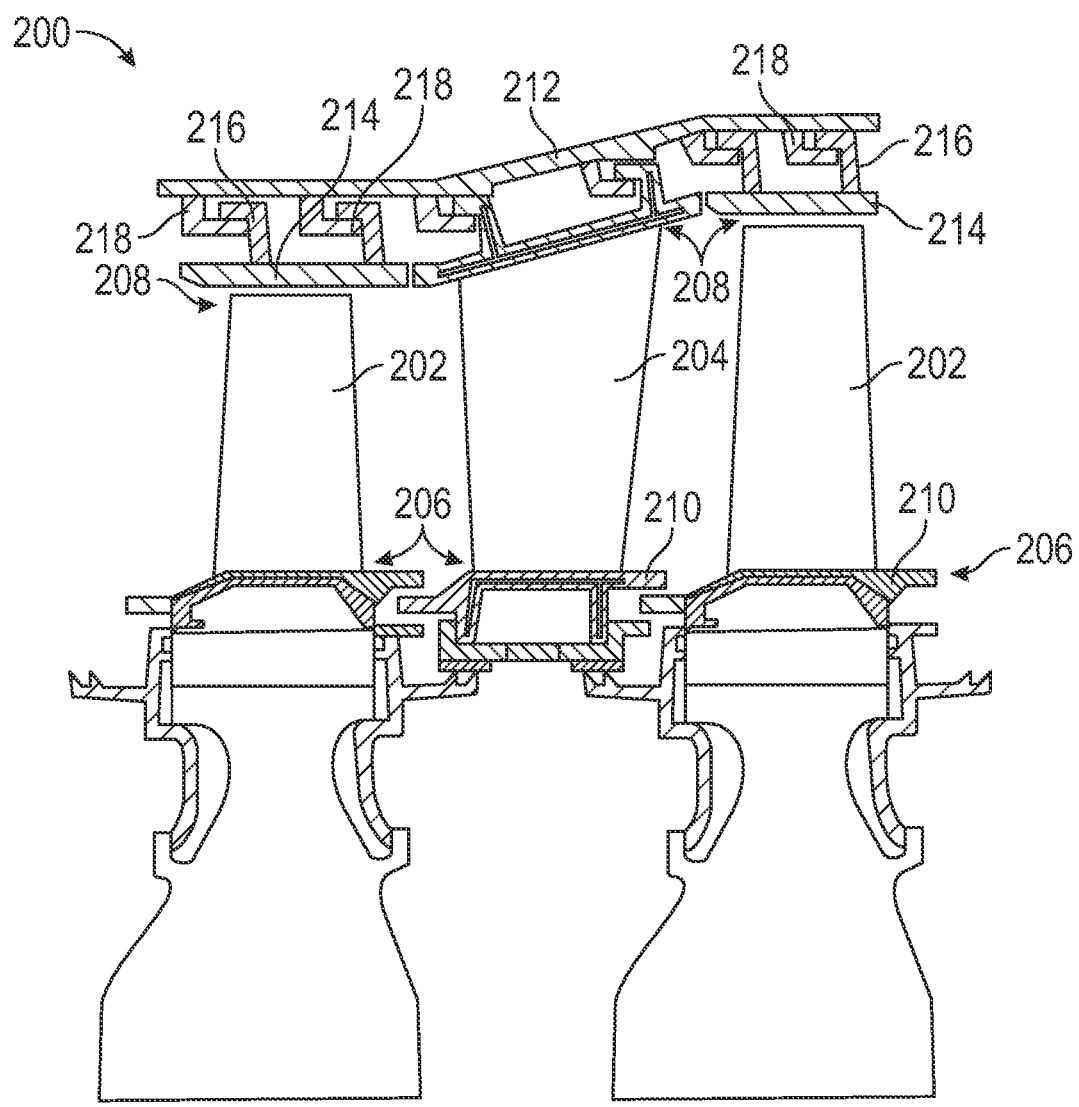
FIG. 2 is a schematic illustration of a portion of a gas turbine engine that may employ embodiments of the present disclosure.

FIG. 2 is a schematic view of a turbine section that may employ various embodiments disclosed herein. Turbine 200 includes a plurality of airfoils, including, for example, one or more blades 202 and vanes 204. The blades 202 and/or the vanes 204 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions within the blades 202 and/or the vanes 204 that may extend either from the inner diameter 206 or the outer diameter 208 of the blades 202 and/or the vanes 204. The partitions may extend for a portion of the length of the blades 202 and/or the vanes 204 but may stop or end prior to forming a complete wall within the blades 202 and/or the vanes 204. Thus, each of the airfoil cavities may be fluidly connected and form a fluid path within the respective blades 202 and/or the vanes 204. The blades 202 and the vanes 204 may include platforms 210 located proximal to the inner diameter thereof. Located below the platforms 210 may be airflow ports and/or bleed orifices that enable air to bleed from the internal cavities of the blade 202 and/or the vanes 204. A root of the airfoil may be connected to or be part of the platform 210.

The turbine 200 is housed within a case 212, which may have multiple parts (e.g., turbine case, diffuser case, etc.). In various locations, components, such as seals, may be positioned between the blades 202 and/or the vanes 204 and the case 212. For example, as shown in FIG. 2, blade outer air seals 214 (hereafter "BOAS") are located radially outward from the blades 202. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 216 that engage with the hooks 218 to secure the BOAS 214 between the case 212 and a tip of the blade 202.

Figure 3:
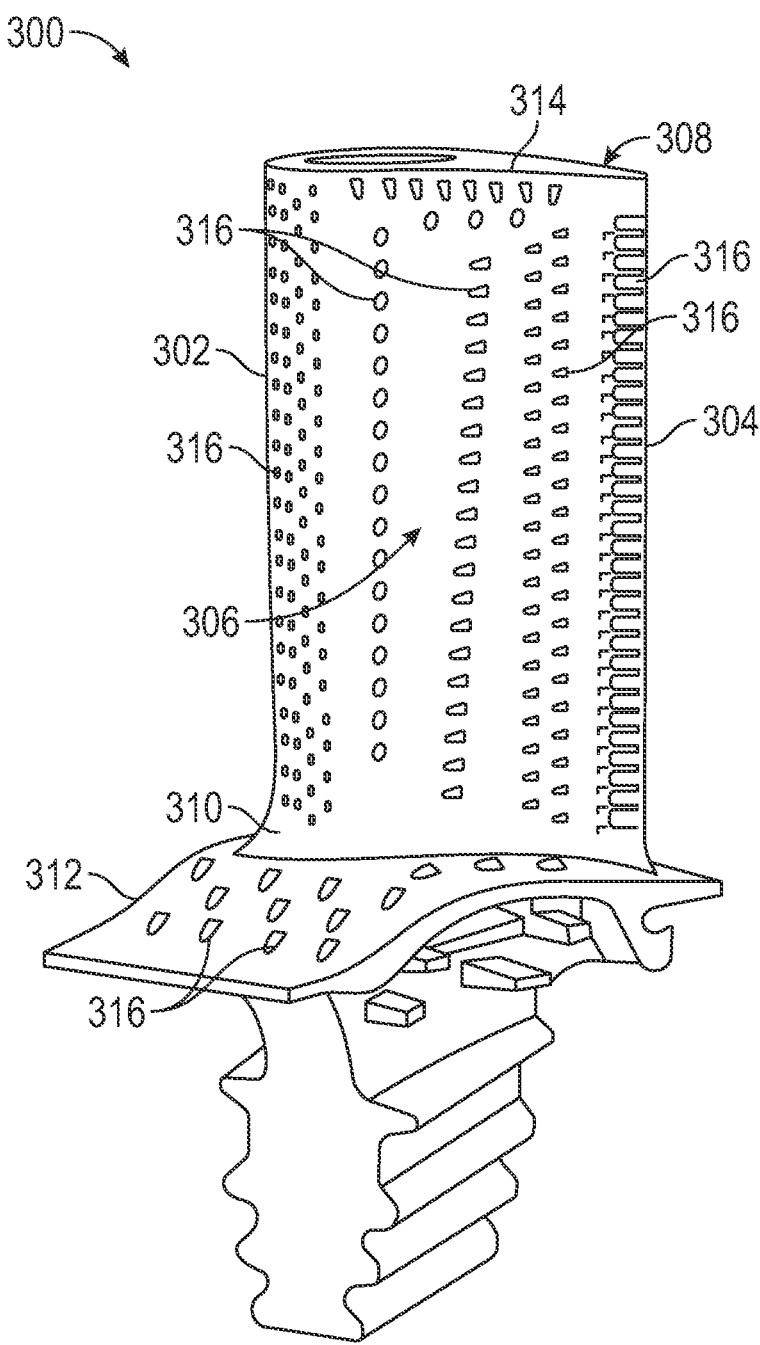
FIG. 3 is a perspective view of an airfoil for the gas turbine engine, in a rotor blade configuration.

Turning now to FIG. 3, a schematic illustration of an airfoil 300 for gas turbine engine in accordance with an embodiment of the present disclosure is shown. The airfoil 300, in this illustrative configuration, is arranged as a rotor blade for use in, for example, a compression or turbine section of a gas turbine engine. The airfoil 300 extends axially between a leading edge 302 to a trailing edge 304, defining a pressure side surface 306 (e.g., front in FIG. 3) and a suction side surface 308 (e.g., back in FIG. 3) therebetween. The pressure side surface 306 and the suction side surface 308 form major opposing surfaces or walls of the airfoil 300, extending axially between the leading edge 302 and the trailing edge 304, and radially from a root section 310, adjacent an inner diameter (ID) platform 312, to a tip section 314, opposite the ID platform 312. In some non-limiting configurations, the tip section 314 may be shrouded. The airfoil 300 includes cooling holes or outlets 316 that are provided on one or more surfaces of airfoil 300. For example, as shown, the cooling holes 316 may be arranged along the leading edge 302, the trailing edge 304, the pressure side surface 306, and/or the suction side surface 308, or combinations thereof. Cooling holes or passages may also be provided on end wall surfaces of airfoil 300, for example along the ID platform 312 and/or on a shroud or engine casing adjacent the tip section 314. The cooling holes 316 may be arranged to generate film cooling on exterior surfaces of the airfoil 300, to serve to generate pressure differentials to pull cooling air through interior cavities of the airfoil 300, or for other cooling purposes as will be appreciated by those of skill in the art.

Figure 4:
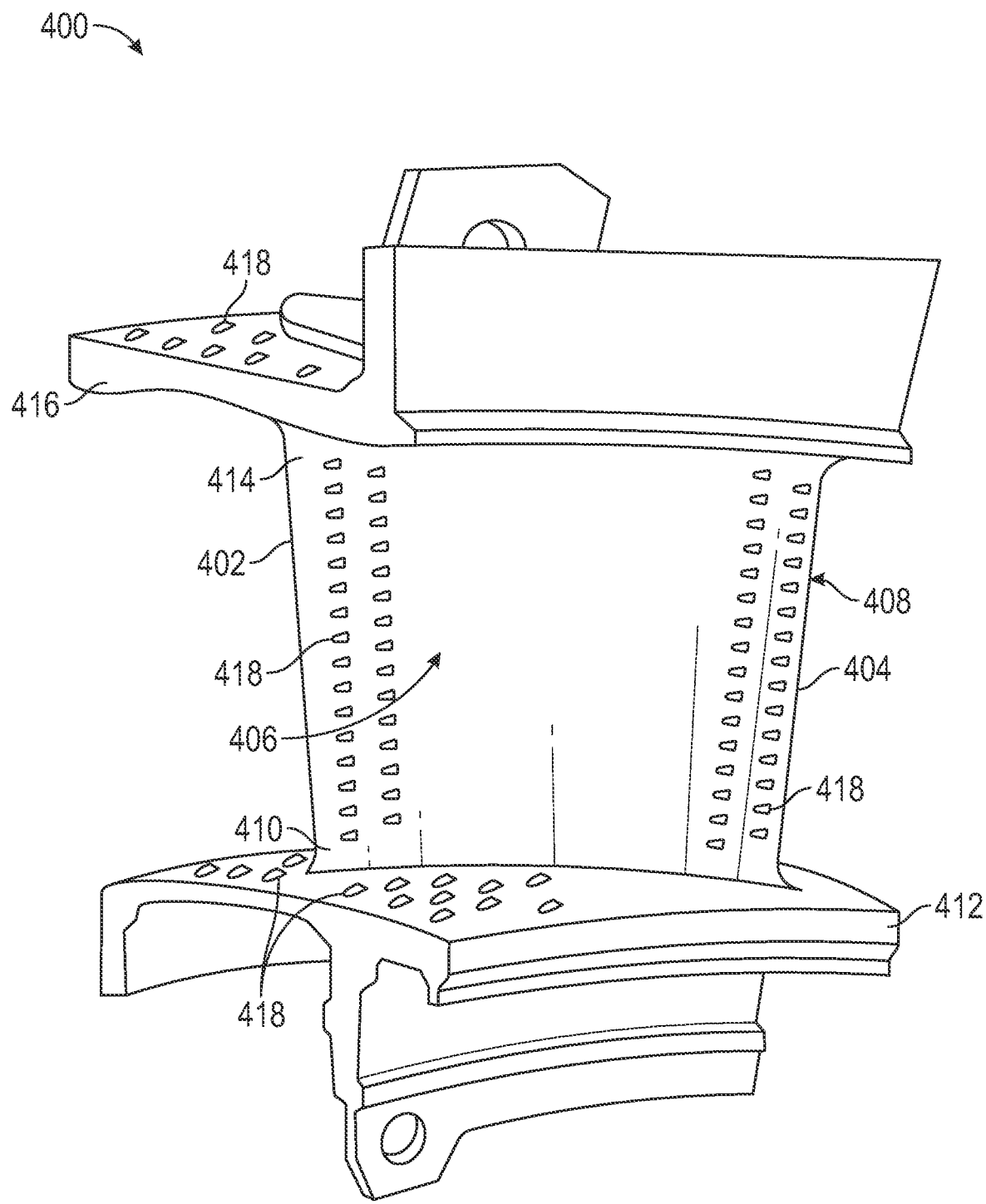
FIG. 4 is a perspective view of an airfoil for the gas turbine engine, in a stator vane configuration.

Turning now to FIG. 4, a schematic illustration of an airfoil 400 for gas turbine engine in accordance with an embodiment of the present disclosure is shown. The airfoil 400, in this illustrative configuration, is arranged as a stator vane for use in, for example, a compression or turbine section of a gas turbine engine. The airfoil 400 extends axially between a leading edge 402 and a trailing edge 404, defining a pressure side surface 406 (e.g., front in FIG. 4) and a suction side surface 408 (e.g., back in FIG. 4) therebetween. The pressure side surface 406 and the suction side surface 408 extend from an inner (or root) section 410, adjacent an ID platform 412, to an outer (or tip) section 414, adjacent an outer diameter (OD) platform 416. Cooling holes or outlets 418 are provided along one or more surfaces of the airfoil 400. For example, as shown, the cooling holes 418 may be arranged along the leading edge 402, the trailing edge 408, the pressure side surface 406, and/or the suction side surface 408, or combinations thereof. The cooling holes or outlets 418 may also be provided on the end wall surfaces of the airfoil 400, including, for example, along the ID platform 412 and/or the OD platform 416. The cooling holes 418 may be arranged to generate film cooling on exterior surfaces of the airfoil 400, to serve to generate pressure differentials to pull cooling air through interior cavities of the airfoil 400, or for other cooling purposes as will be appreciated by those of skill in the art.

It will be appreciated that the airfoils described, and other airfoils for use in gas turbine engines, may be formed of high strength, heat resistant materials such as high temperature alloys and superalloys. Further, such airfoils may be provided with thermal oxidation, environmental, and/or erosion-resistant coatings. Such airfoils are typically provided with internal cooling passages and the cooling holes are arranged to reduce thermal operating metal temperatures, as well as, minimize thru wall and in-plane temperature gradients. Such operating conditions induce accelerated thermal mechanical fatigue and oxidation erosion wear related failure mechanisms due to high thermal mechanical strains and metal temperatures exhibited during transient operation. The utilization of film cooling reduces the local heat flux and operating metal temperatures by providing an insulating boundary layer of cooler air immediately adjacent to the hot exterior airfoil surfaces. The utilization of film cooling is essential in mitigating potentially high local operating temperatures of the ceramic coating, metallic bond coat, and substrate materials used within the combustor and turbine sections of the propulsion system. Prolonged high temperature exposure significantly degrades the thermal-mechanical capabilities of the coating systems and materials used in combustor panels and turbine airfoil components.

Both combustor and turbine airfoils are commonly subjected to freestream gas temperatures that exceed the incipient melting temperatures of the nickel-based super-alloys used in both aero- and land-based engine applications. Therefore, when combustor and turbine components are exposed to hot external gas temperatures in a gas turbine engine or other turbomachine applications utilizing only purely convective cooling design concepts become increasingly inefficient from both a thermal and propulsive efficiency perspective, because significantly more cooling air would be necessary to achieve required operating metal temperatures in order to meet hot section component durability life requirements. As such, it becomes more desirable to integrate both convective and film cooling design concepts in order to achieve turbine module efficiency and propulsion system total specific fuel consumption metrics.

In order to mitigate the required cooling air flow needed to achieve aggressive hot section component life requirements, it becomes necessary to optimize both convective and film cooling design concepts. In this regard, the design of specific film cooling hole arrays and cooling hole geometries may be better leverage to maximize both film cooling performance, while also minimizing momentum mixing losses that naturally occur between the film cooling discharge flow and the mainstream gas boundary layer flow along the airfoil surfaces. The film cooling hole arrays and individual cooling holes may be configured to deliver cooling fluid (e.g., steam or air from a compressor) through outer exterior walls and platform structures of the respective airfoils, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Accordingly, in accordance with some embodiments of the present disclosure, cooling holes are described having improved metering and inlet/outlet geometries to improve overall film cooling performance and increase adiabatic film effectiveness. Unique geometric metering and diffuser shapes can be used to improve the robustness of film cooling over a wider range of film hole operating pressure ratios, blowing, and momentum flux ratios where film cooling discharge may occur in either favorable and/or adverse pressure flow fields along the airfoil and/or platform surfaces. Additionally, utilization of unique meter and diffuser geometries may be combined to create in-hole cooling flow vortices that reduce the propensity of discrete film "jetting," diffuser flow separation, and blow off.

Similarly, the combination and transitioning between meter and diffuser geometries will enable improved lateral spreading and fill characteristics within the diffuser section of a film cooling hole. As such, increased meter-to-diffuser area ratios, or expansion ratios, are achievable without suffering from the adverse consequences associated with flow separation from the diffuser section of the cooling hole due to over expansion. Detached film flow within the diffuser section of the film cooling hole can produce highly unsteady flow vortices which induce entrainment of hot external gas thereby reducing the overall film cooling performance. Tailoring and transitioning of the diffuser geometry along the streamwise direction also improves the flow quality of the film cooling flow as it is discharged along the external airfoil surface. The diffuser exit geometry may further be tailored to reduce flow separation and corner effects by reducing the relative surface angle formed between the film hole footprint exit and the external airfoil surface.

Additionally, the local film cooling vortices which exist along the outer extremes of the film cooling boundary layer can also be significantly dampened, thereby reducing film attenuation and dissipation rates downstream of the film injection location. Thus, cooling holes as described herein can reduce hot section component cooling flow requirements due to the improved flow quality of the film cooling fluid and the increased lateral spreading of the colder protective insulating film boundary layer across hot outer surfaces of airfoils, and other gas turbine engine components. In this regard, less film cooling flow is required for cooling and efficiency is maintained or increased. In accordance with some embodiments, the cooling holes described herein provide a cooling solution that offers improved film cooling and eliminates or reduces the flow separation problems associated with conventional diffusion-type film cooling holes. The described cooling holes provide improved film effectiveness and reduce the likelihood of film separation such that the film cooling hole performance is not compromised over a wider range of blowing and momentum flux ratios where film cooling discharge may occur in either favorable and/or adverse pressure flow fields along the airfoil and/or platform surfaces.

Some cooling holes include two sections: (1) a metering section at or near a hole inlet and (2) a diffusing section at or near a hole outlet. As such, a cooling flow will enter and pass through the metering section and exit from the cooling hole through the diffusing section. The metering section "meters" the flow of cooling air, regulating a velocity and quantity of air that enters through the hole inlet. Air flowing through the metering section enters the diffusing section before reaching the hole exit plane where the film cooling flow is discharged along the airfoil exterior surface. The diffusing section causes the cooling air to expand (diffuse) along a streamwise direction allowing the film cooling flow to be distributed over a wider region thereby enabling a large portion of the airfoil surface area to be covered by a protective thin boundary layer of film cooling air. The expansion of the film cooling flow occurs in a predominantly lateral direction which may be defined nearly perpendicular to the film cooling hole centerline orientation as it is ejected along the airfoil surface. In order to maximize the dispersion of the film cooling flow it becomes desirable to increase the area ratio or expansion ratio of the diffuser flow area relative to the metering flow area. As such a wider film trace defined by the width of the film cooling boundary layer may be achieved thereby increasing the "coverage" of the film cooling flow along the airfoil surface.

Figure 5:
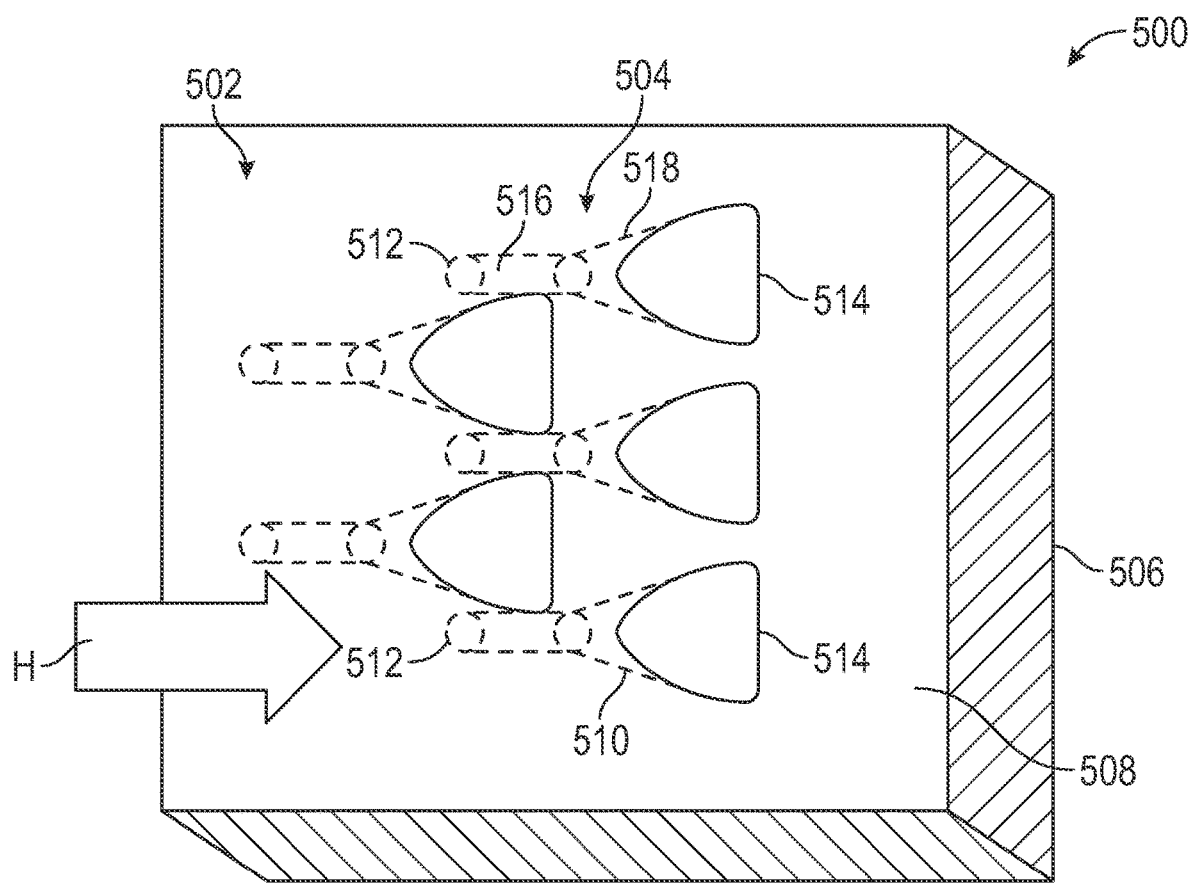
FIG. 5 is a schematic illustration of an array of cooling holes in accordance with an embodiment of the present disclosure.

FIG. 5 is a schematic illustration of a portion of a component 500 of a gas turbine engine, such as an airfoil, BOAS, platform, etc. The component 500 includes a component wall 502 that may be an exterior hot wall or wall that is exposed to hot gas during operation of a gas turbine engine. The component wall 502 includes an array of cooling holes 504. The component wall 502 defines an inner wall surface 506 and an outer wall surface 508. In some configurations, the component wall 502 is primarily metallic and the outer wall surface 508 can include a thermal barrier coating. Each cooling hole 510 of the array of cooling holes 504 is oriented so that an inlet 512 is positioned on the inner wall surface 506 and an outlet 514 are positioned on outer wall surface 508. The inlet 512 is a hole or opening formed in the inner wall surface 506 and the cooling hole 510 defines a fluid passage from the inlet 512 to the outlet 514 which is a hole or opening formed in the outer wall surface 508. Each cooling hole 510 includes a metering section 516 and a diffusing section 518.

During operation of a gas turbine engine, the outer wall surface 508 is in proximity to or in thermal contact with high temperature gases (e.g., combustion gases, hot air, etc.). Cooling air is delivered from inside the component 500 and inside the component wall 502 where it exits the interior of the component 500 through the cooling holes 510 and forms a cooling film on the outer wall surface 508. The metering section 516 of each cooling hole may have a substantially constant shape extending from the inlet 512 to the diffusing section 518. The diffusing section 518 of each cooling hole 510 includes a gradually increasing and expanding flow area as defined by a plane perpendicular to the centerline and/or streamwise flow direction of the cooling airflow within the film cooling hole. As such the geometric attributes defining the diffuser section of the film cooling hole comprise of various geometric features that are not of constant size, shape, or length along a streamwise or flow direction of the cooling air that is transported from the metering section 516 to the outlet 514.

In some embodiments, the diffusing section 518 can include one or more discrete geometric shapes that may be used to modify the local flow vortices of the cooling airflow within both the metering and diffuser sections of the cooling hole geometry. Incorporation of conical discrete lobe geometry features may be utilized to improve diffuser section fill characteristics, as well as, the quality and uniformity of the film cooling airflow that is discharged along the airfoil surface. The utilization of one or more discrete continuously expanding lobe geometry features facilitate the ability to increase meter-to-diffuser area ratios and expansion ratios in order to maximize the lateral diffusion of cooling air as it flows through the diffuser section 518. As such incorporation of discrete lobed geometric features enable increased meter-to-diffuser expansion ratios to be achieved without compromising the adverse film cooling performance typically associated with more conventional diffuser section geometries in which cooling hole area ratio and expansion ratios may be limiting due to the increased propensity for in-hole diffuser flow separation, resulting in poor film flow quality and reduced adiabatic film cooling effectiveness characteristics.

Cooling air will enter the metering section 516 of each cooling hole 510 and flow out of the diffusing section 518. The cooling holes 510 can be arranged in rows, columns, offset groups, or in other array geometries on the component wall 502. The cooling holes 510 may be positioned axially so that the cooling air flows in substantially the same direction longitudinally as high temperature gases flowing along the component wall 502 (indicated by arrow H in FIG. 5). As shown, a line or column of cooling holes 510 of the array of cooling holes 504 is substantially perpendicular to the direction of flow H. In some embodiments, the orientation of cooling holes in accordance with the present disclosure can be arranged on an outer wall surface so that the flow of cooling air is substantially perpendicular to the high temperature gas flow (e.g., cooling air exits cooling holes in a radially direction of an airfoil) or at an angle between parallel and perpendicular (e.g., a compound angle). As shown, the rows or columns of cooling holes 510 shown in FIG. 5 are arranged in a staggered formation on the component wall 502. Although shown in FIG. 5 with respect to a component wall, the cooling holes 510 can be located on a variety of components that require film cooling. Suitable components include, but are not limited to, turbine vanes and blades, blade or vane platforms, shrouds, end walls, combustor panels, blade outer air seals (BOAS), etc.

As turbine inlet operating temperatures and turbine component life requirements continue to increase the need to develop improved convective and film cooling concepts becomes more challenging. The demand to maintain and/or reduce turbine cooling air requirements in order to achieve aggressive stage and turbine component and module performance efficiency requirements also continues to be a challenge. One way to maintain and/or mitigate hot section component cooling flow requirements is to incorporate advance film cooling design concepts that increase cooling film effectiveness without the need to add additional film cooling holes. Similarly, it is also desirable to improve the insulating film cooling boundary layer by making it less susceptible to hot gas entrainment and mixing. The film cooling flow vortices induced by some geometric shapes of the film cooling geometry can increase the mixing rate between the freestream (e.g., hot) gas path air and the local film cooling air from the cooling holes. The increases in turbulent mixing result in an accelerated dissipation or decay rate of the cooling film that is intended to reduce the local external heat flux that the hot section engine airfoil component is subjected to. As a result of poor film cooling characteristics, additional film cooling flow is often necessary to mitigate both local and bulk airfoil durability distress failure modes related to oxidation, thermal mechanical fatigue, and creep.

In accordance with some embodiments of the present disclosure, the quality of the film cooling flow may be improved by incorporating cooling hole geometric features as described herein. In order to mitigate local in-hole vortices as well as improve lateral diffusion of the film cooling flow, geometric concepts that condition the film flow prior to being discharged along the exterior gas path surface of the hot section component may be incorporated into design practice. Some embodiments of the present disclosure are intended to address improving the in-hole flow structure of the film cooling air through geometry features of components or regions of the film cooling hole design geometry. The cooling holes may be divided into different regions or sections: a metering section, a covered transition region, partially covered transition region, an uncovered transition region, and a discharge region. Some embodiments of the present disclosure are directed to geometric features of cooling holes which enable an increase in the meter-to-diffuser area ratio, AR, ranging between (1.05≤AR≤6) of the diffusing section of the film cooling hole, as compared to prior film cooling hole cooling hole geometries which typically are designed to have a meter-to-diffuser area ratio ranging between (1.05≤AR≤3.0). Incorporation of one or more discrete lobed diffuser geometries mitigate the potential for film flow separation resulting from over expanding diffusers, due to large meter-to-diffuser area and expansion ratios.

Figure 6A:
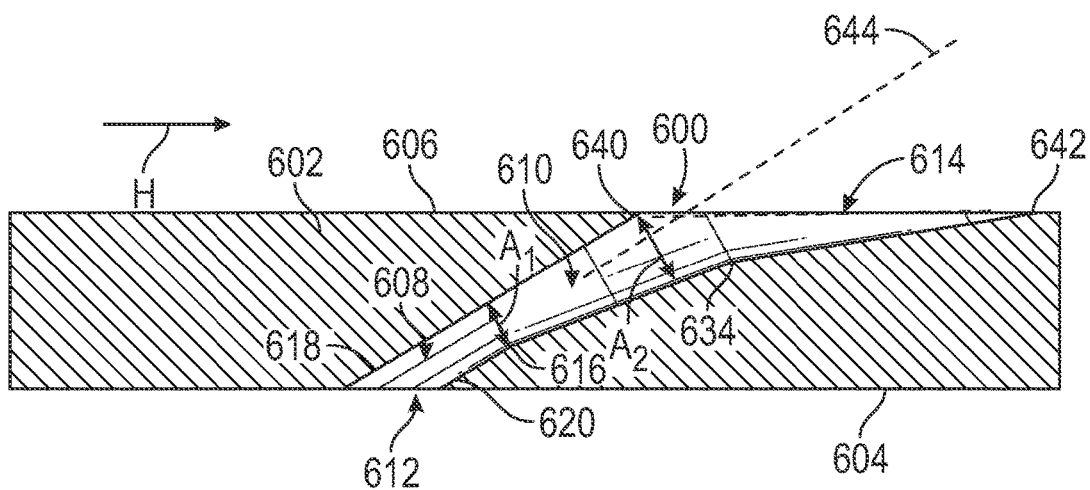
FIG. 6A is a cross section view of a cooling hole in accordance with an embodiment of the present disclosure.

In reference to FIG. 6A, a meter-to-diffuser area ratio AR, is the ratio of the exit flow area $A_2$, defined as a plane perpendicular to the cooling hole centerline or hole axis 644 that intersects with an upstream edge 640, relative to the flow area $A_1$ at an exit of a metering section 608, defined as a plane perpendicular to the cooling hole centerline or hole axis 644 that is at the streamwise end of the metering section 608. The flow area $A_1$ is the flow area at the start of the transition plane coincident with point 616 shown in FIG. 6A. The ability to increase the overall lateral spreading of the film cooling flow while mitigating or eliminating local film hole exit flow vortices that promote hot gas entrainment and accelerate film dissipation rates can maximize the utilization of film cooling to improve local and overall hot section component durability.

Figure 6B:
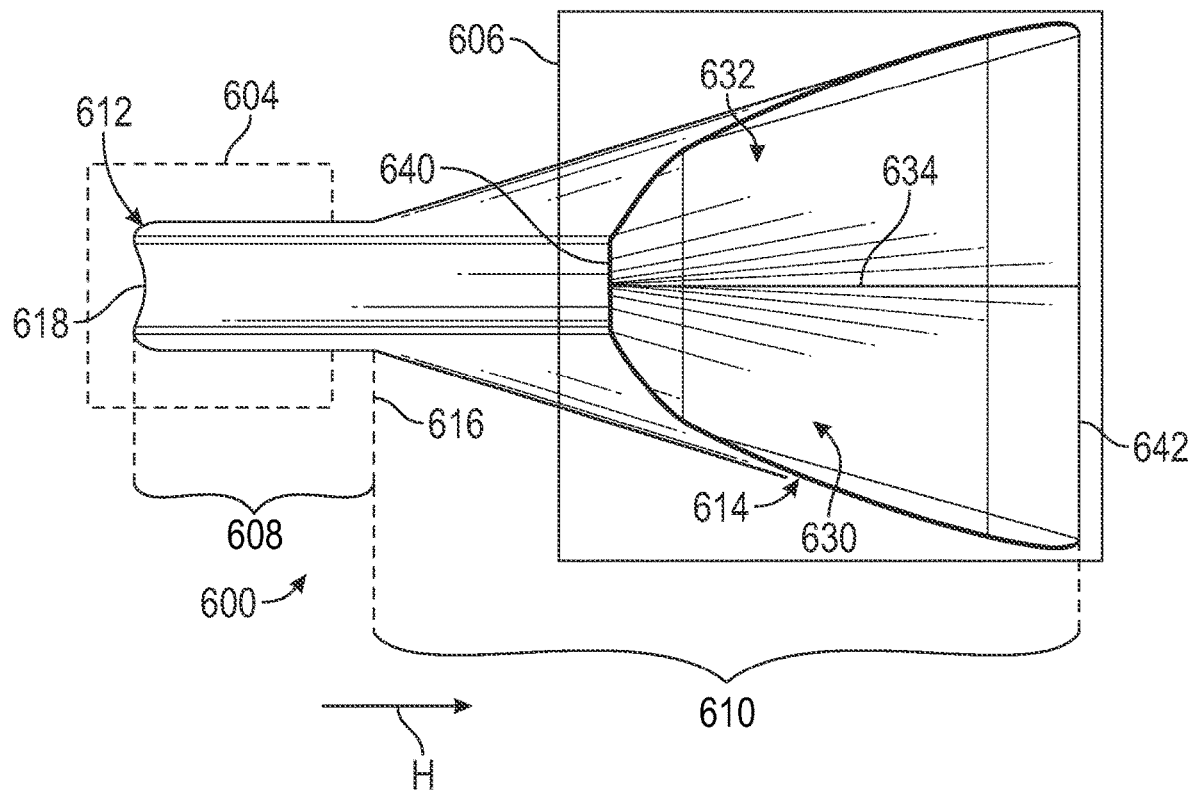
FIG. 6B is a view of the cooling hole of FIG. 6A viewed normal to a surface of a component in which the cooling hole is formed.
Figure 6C:
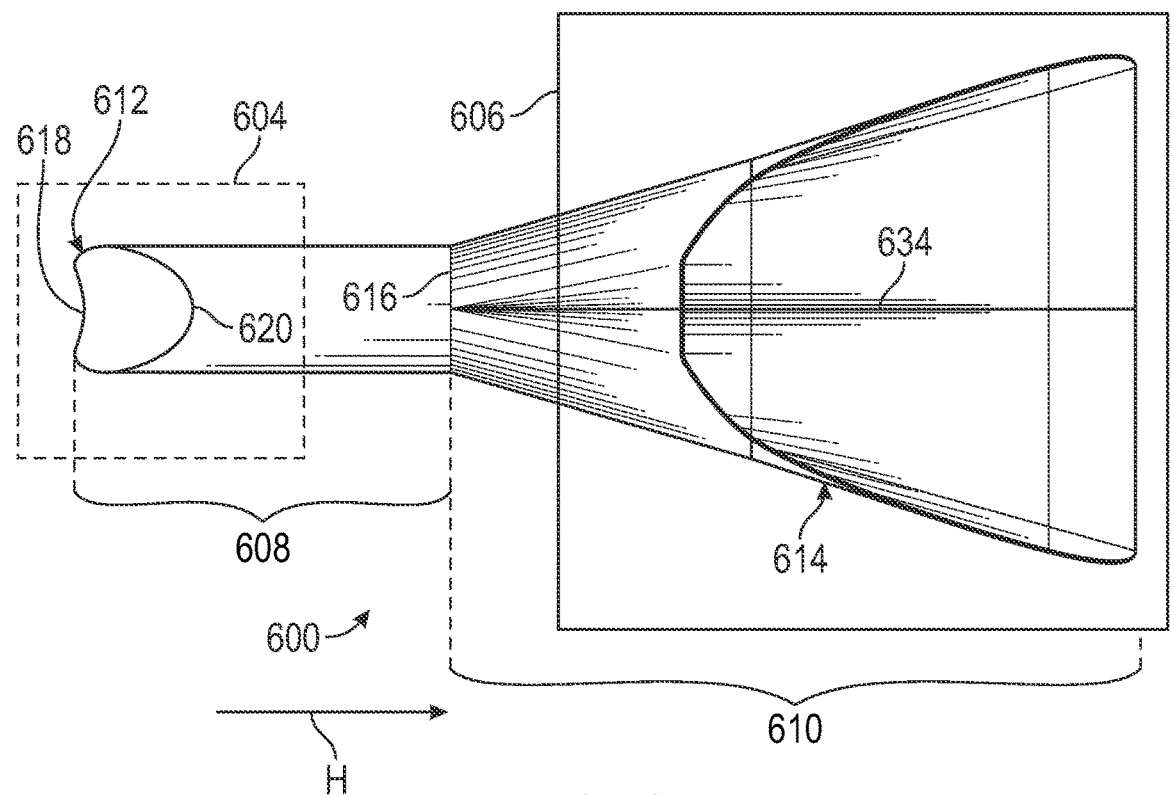
FIG. 6C is a view of the cooling hole of FIG. 6A viewed normal to a surface of a component in which the cooling hole is formed, with portions thereof being transparent.
Figure 6D:
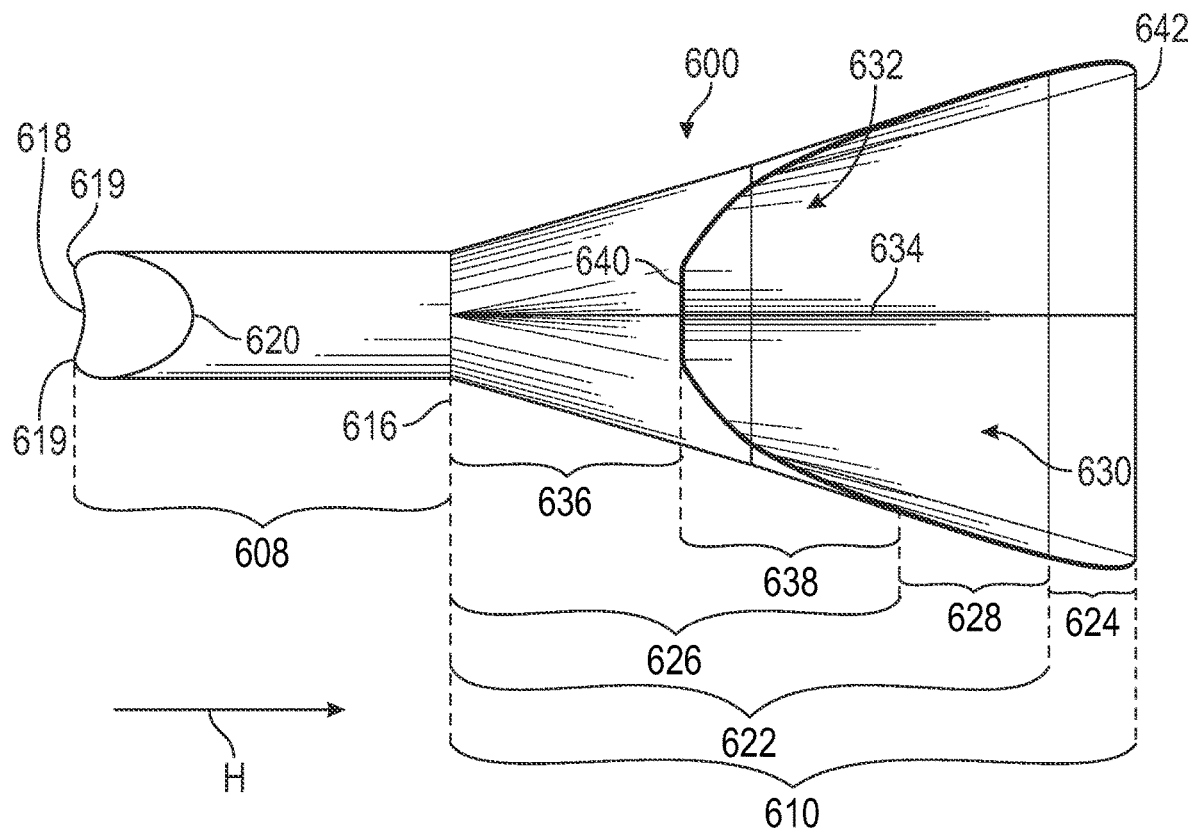
FIG. 6D is a view of the cooling hole of FIG. 6A viewed normal to a surface of a component in which the cooling hole is formed, with portions thereof being transparent.

Turning now to FIGS. 6A-6D, schematic illustrations of a cooling hole 600 in accordance with an embodiment of the present disclosure are shown. The cooling hole 600 is formed within a component wall 602. The component wall 602 has an inner wall surface 604 and an outer exterior wall surface 606. The cooling hole 600 has a metering section 608 and a diffusing section 610. The cooling hole 600 defines a hole or aperture through the component wall 602 that fluidly extends between an inlet flow plane 612 formed in the inner wall surface 604 and an outlet plane 614 formed in the outer exterior wall surface 606. FIG. 6A is a side cross section view of the cooling hole 600. FIG. 6B is a plan down view looking at the outer wall surface illustrating the surfaces of the cooling hole 600. FIG. 6C is a plan down view looking at the outer wall surface illustrating the surfaces of the cooling hole 600 with portions being transparent. FIG. 6D is a schematic illustration of the surfaces of the cooling hole 600, in isolation, illustrating sections thereof. In FIGS. 6A-6D, the cooling hole 600 is positioned axially so that a cooling air flows in substantially the same direction longitudinally as high temperature gases flowing along the component wall 602 (indicated by arrow H).

The metering section 608 extends from the inlet flow plane 612 to a transition plane which is coincident with point 616. At the transition plane coincident with point 616, the cooling hole geometry 600 transitions from the metering section 608 to the diffusing section 610. The metering section 608 is a section of the cooling hole 600 having constant geometry, shape, size, and flow area along an axial length and/or aligned with the in-hole cooling air streamwise flow direction through the cooling hole 600. In contrast, the diffusing section 610 of the cooling hole 600 comprises of various geometric attributes that are not of constant size, shape, and length along a streamwise direction that is predominately aligned with the discrete expanding conical lobed features within the diffuser section 610, as the cooling air is being transported through the cooling hole 600. The diffusing section 610 extends from the transition plane coincident with point 616 and expands to the outlet film cooling hole exit flow plane 614.

The purpose of the metering section 608 is to control the amount of mass flow that the cooling hole 600 will utilize during operation. Additionally, the metering section 608 is used to condition or develop a cooling flow prior to entering first or covered region of the diffuser section 610. In this embodiment, the metering section 608 of the cooling hole 600 consists of two concave arc surfaces 618, 620. As shown in FIG. 6C, an upper (top) concave surface 618 of the metering section 608 defines less surface area than that of a lower (bottom) concave surface 620 of the metering section 600 resulting in a difference in a skin friction and wall shear losses between the upper concave surface 618 and the lower surface 620 of the metering section 608. The difference in frictional loss, combined with the local curvature, and converging area occurring at intersecting corners or points of the upper concave surface 618 and the lower concave surface 620, creates a pair of counter rotating vortex structures that result in a favorable pressure gradient in the metering section 608 of the cooling hole 600 driving a coolant flow from the upper concave surface 618 toward the lower concave surface 620 of the metering section 608. The flow migration toward the lower concave surface 620 of the metering section 608 enables a multi-lobe diffusing section 610 of the cooling hole 600 to fill more completely and uniformly as the cooling hole 600 expands toward an external gas path surface at the outlet plane 614.

The differences in local wall shear between the lower surface 620 of the curved metering section which has more surface area ($P_{lower} \times L$) per unit length relative to the upper or top surface ($P_{upper} \times L$), where $P_{lower}$ and $P_{upper}$ are the respective arc lengths of each of the curved metering surfaces. The curved metering shape in combination with the cooling hole 600 velocity profile at the inlet flow plane 612, along with the reduction in local flow area where both the lower and upper metering surfaces converge at the extreme ends or extreme corners 619 are also contributing factors to generating the local in-hole pressure gradients which inherently influence the local vortex structures within the metering section of the cooling hole 600.

The flow distribution within the curved metering section 608 of the cooling hole 600 generates a pair of counter-rotating vortices where the slower moving, lower velocity flow, occurs along the lower surface 620, while the faster, higher velocity flow, occurs along the upper surface 618 of the metering section 608. The resulting pressure gradient create a pair of counter rotating vorticities which forces the majority of the "core" of the coolant flow towards the upper metering surface 608 and into the extreme corners 619 of the metering section (shown in FIG. 6D), and subsequently forces the "core" coolant flow downward into the lower concave surface 620 of the metering section 608. The cooling flow redistribution and in-hole counter rotating vortices generated within the curved meter section 608 facilitates the movement of cooling flow to completely "fill" each of the discrete bifurcated diffuser lobed geometry features defined within the first fully covered sub-section 636, while ensuring complete fill as the cooling flow is expanded through the second partially covered sub-section 638 of the cover section 626.

To ensure complete fill of each of the bifurcated diffuser lobes over the entire length of the covered diffusion section 626 in the streamwise flow direction, the fully covered sub-section must have adequate development length to ensure the in-hole vortex structure is fully developed. In order to maintain and strengthen the counter rotating vortices the first sub-section 636 of the covered diffusion section 626 must have a development length, L, that ranges from $1.5 \leq Dh \leq 2.5$, where, Dh, is defined as the hydraulic diameter based on the average of each of the discrete lobe radii defined at location that is 0.5 L of the fully covered sub-section 636. Additionally, within the first sub-section 636 the bifurcated discrete lobes create a ridged surface 634 at a location where the two lobes 630 and 632 become tangent. The ridge surface 634 effectively creates two distinct conically shaped "trough-like" channels which enable the airflow within the expanding covered section 626 of the diffuser to have improved flow quality characteristics that enable further increases in total area ratio and expansion ratio, without suffering the adverse consequences of flow separation and hot gas entrainment associated with conventional over expanded single sided planar film hole diffuser geometries.

The diffusing section 610 may be subdivided into regions or portions, as shown in FIG. 6D. The diffusing section 610, in accordance with this illustrative embodiment of the present disclosure, includes a lobed portion 622 and a flat portion 624. The lobed portion 622 may be further divided into a covered region 626 and an uncovered region 628. The lobed portion 622 includes a first lobe 630 and a second lobe 632 that are separated by a ridge surface 634. Each lobe 630, 632 is defined by a curved and generally conical surface extending from the transition point 616 to the flat portion 624.

The covered region 626 of the lobed portion 622 is defined as the total streamwise distance of the covered length between the end of the metering section 608 (e.g., at the transition point 616) to a maximum distance where the leeward, or upper internal surface of the cooling hole 600 intersects the outer exterior wall surface 606. The covered region 626 may be divided into two sub-sections, a fully covered sub-section 636 and a partially covered sub-section

638. The fully covered sub-section 636 of the covered region 626, defined in the streamwise direction, and is defined between the transition point 616 a plane normal to the hole axis 644 at an upstream edge 640 of the outlet plane 614. The partially covered sub-section 638 extends between a plane normal to the hole axis 644 at the upstream edge 640 of the outlet plane 614 and a location at the inflection point of the ridge 634, as defined herein, and normal to the hole axis 644.

The transition from the single lower concave surface 620 of the metering section 608 to the lobed surfaces of the diffusing section 610 must occur within the fully covered sub-section 636 in order to establish a reasonable length for the counter rotating vortex structures between each of the two bifurcated lobed geometries to be formed and developed. It is noted that the radii of each of the lobes 630, 632 increases or expands in the streamwise direction through the lobed portion 622 of the cooling hole 600. The increase in the radii of the lobes 630, 632 reflects the expansion of the diffusing section 610.

Once the film cooling flow passes through the covered region 626 the expansion of the diffusing section 622 continues into the uncovered region 628. In the uncovered region 628, the geometry of the lobed portion 622 initially begins with the two conical lobe geometries consistent with those defined at the end of the covered region 626. The location at which the two discrete conical lobe tangencies are coincident form the ridge 634, which bifurcates the two lobed regions of the multi-lobe diffusing section 610. The conical lobe geometry then transitions to a unified or combined singular planar surface spanning the entire lateral width of the diffusing section, defined as the flat portion 624. The flat portion 624 extends to a downstream edge 642 of the outlet plane 614 in the outer exterior wall surface 606. The ridge 634 linearly or monotonically decreases in amplitude or height in the streamwise direction along the lobed portion 622.

Within the uncovered region 628, the external flow pressure gradients and wall shear induces a pair of rotating vortices that are not congruent (e.g., opposite) the rotational direction of the paired vortices exiting the covered region 626. In this sense the opposing vortices induced in the uncovered region 628 effectively cancel the vortex swirl initially induced in the fully covered sub-section 636 by the conical lobed geometry features of the diffusing section 610. That is, the canceling of the longitudinal vortices begins to occur at the exit plane 614 of the cooling hole 600 located along a streamwise distance that ranges somewhere between the upstream edge 640 and the downstream edge 642 of the cooling hole 600 and then persists downstream of the downstream edge 642 of the cooling hole exit plane 614 for a distance that is dependent on cooling hole blowing mass flux and momentum flux ratios, as well as, cooling hole area ratio, diffuser surface angle, and local near wall pressure gradients. The resulting film flow characteristics exhibited are substantially "laminar like" due to the significant reduction in the local turbulence intensity.

As the film cooling flow passes through the uncovered region 628, the two lobed flow structures are united to form a continuous insulated boundary layer of film across the entire lateral width of the expanding diffusing section 610, at the flat portion 624. In order to ensure the two flow streams from the conical lobed geometry emanating from the lobes 630, 632 are as distributed and as uniform as possible the flat portion 624 is incorporated into the design. In some non-limiting embodiments, the flat portion 624 may have an axial length (e.g., in a streamwise direction) that may range between 10%-25% of the streamwise length of the cooling hole footprint or exit flow plane 614, as defined from the leeward edge 640 to the downstream edge 642. For example, in some embodiments, the flat portion 624 may have a length of between about 0.010 inch and about 0.050 inch. The flat portion 624 provides some additional film flow development length before the cooling flow will exit the downstream edge 642 of the outlet plane 614. The flat portion of cooling holes in accordance with embodiments of the present disclosure is defined by a flat (no curvature) surface that is recessed from the respective outer wall surface.

Although the above described covered and uncovered portions have been described with respect to a particular definition. It will be appreciated that alternative definitions may be employed without departing from the scope of the present disclosure. For example, referring again to FIG. 6A, the cooling hole 600 defines a hole axis 644, defined by the metering section 608 and angled relative to the inner wall surface 604 and the outer exterior wall surface 606. The covered and uncovered portions of the cooling hole may be defined relative to planes perpendicular to the flow direction.

Figure 7A:
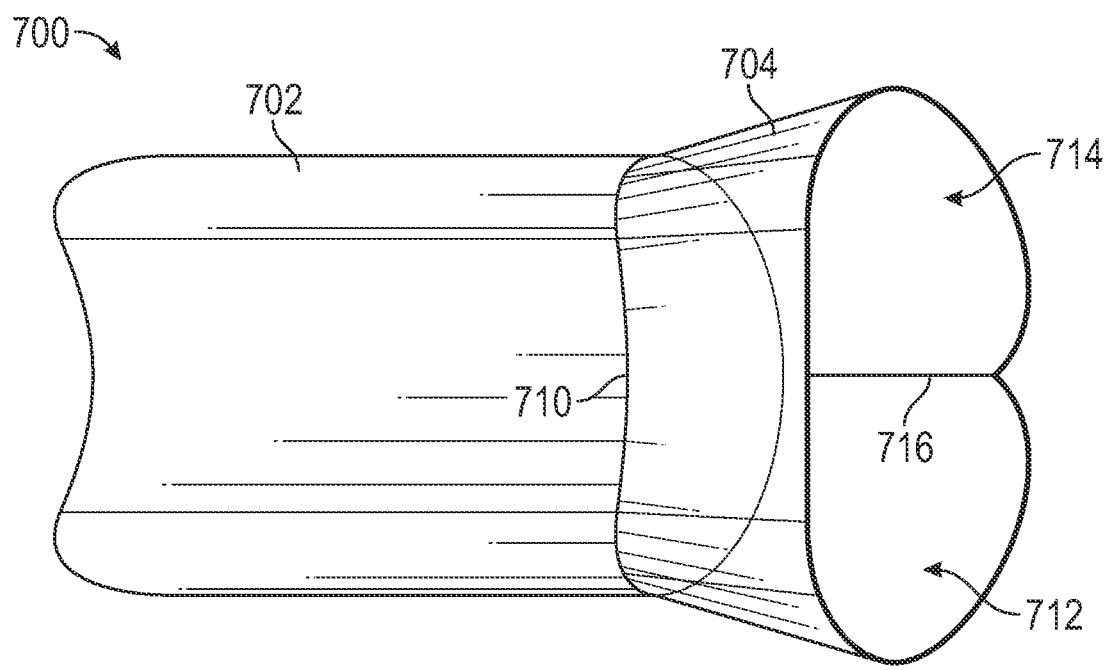
FIG. 7A is a schematic illustration of a portion of a cooling hole in accordance with an embodiment of the present disclosure.
Figure 7B:
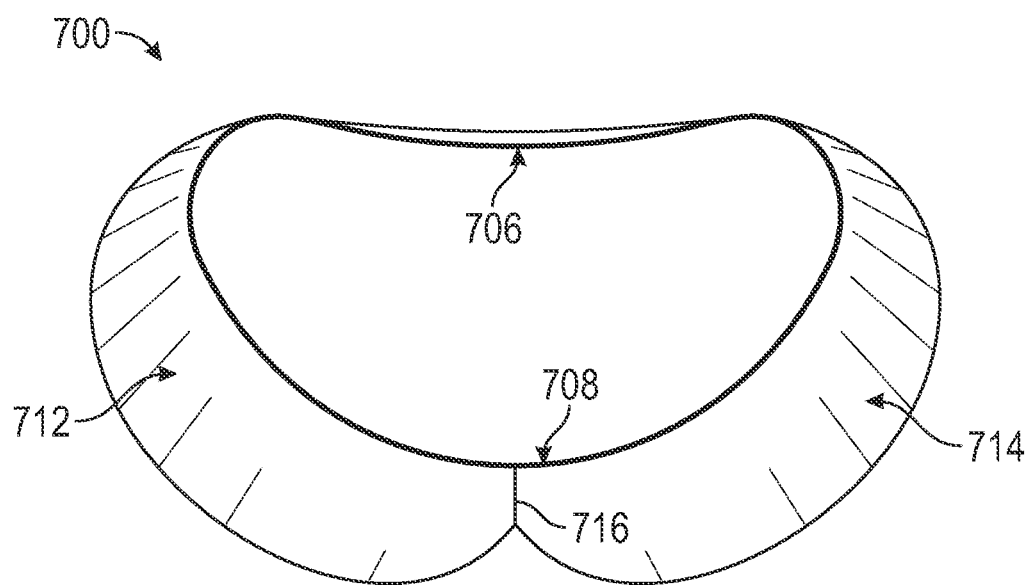
FIG. 7B is an alternative view of the portion of the cooling hole shown in FIG. 7A.

Turning now to FIGS. 7A-7B, schematic illustrations of a portion of a cooling hole 700 in accordance with an embodiment of the present disclosure are shown. In FIGS. 7A-7B, a metering section 702 and a portion of a diffusing section 704 of the cooling hole 700 are illustratively shown. The metering section 702 has a uniform geometry with an upper (top) concave surface 706 and a lower (bottom) concave surface 708. As shown, the upper concave surface 706 defines less surface area than that of the lower concave surface 708. The metering section 702 extends to a transition plane coincident with point 710 where the cooling hole 700 transitions to the bifurcated lobes within the fully covered diffusing first sub-section 704. The fully covered diffusing first sub-section 704 includes a first lobe 712 and a second lobe 714 that are separated by a ridge surface 716. Accordingly, at the transition plane coincident with point 710, the cooling hole 700 transitions from a single, uniform geometry defined by the surfaces 706, 708 of the metering section 702 to a two-lobed geometry of the fully covered diffusing first sub-section 704 of a covered diffuser section. The ridge surface 716 originates at the inlet to the transition plane coincident with point 710 and extends in a streamwise direction along a predominantly linear plane or line from the transition plane coincident with point 710 to a downstream end of the bifurcated lobes 712, 714, to a location coincident with the downstream edge of the cooling hole and the end of the fully covered sub-section 704. In some embodiments, the ridge surface 716 may end at a flat portion of the cooling hole 700.

Figure 8A:
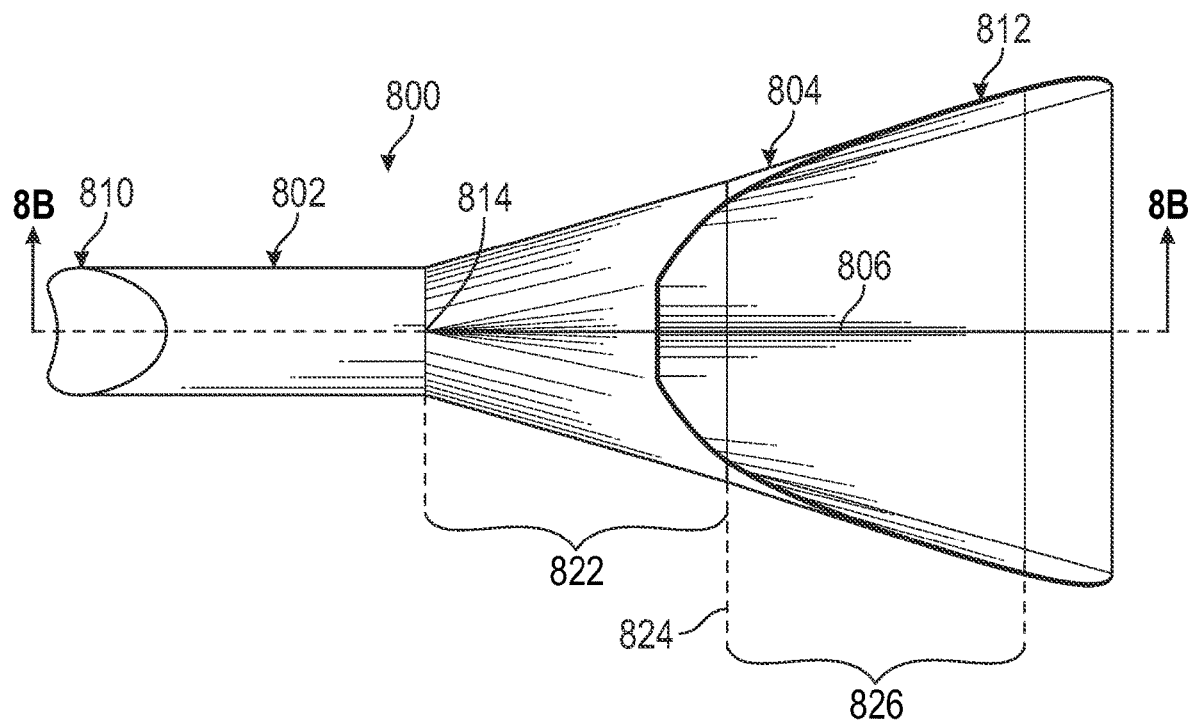
FIG. 8A is a schematic illustration of a cooling hole in accordance with an embodiment of the present disclosure.
Figure 8B:
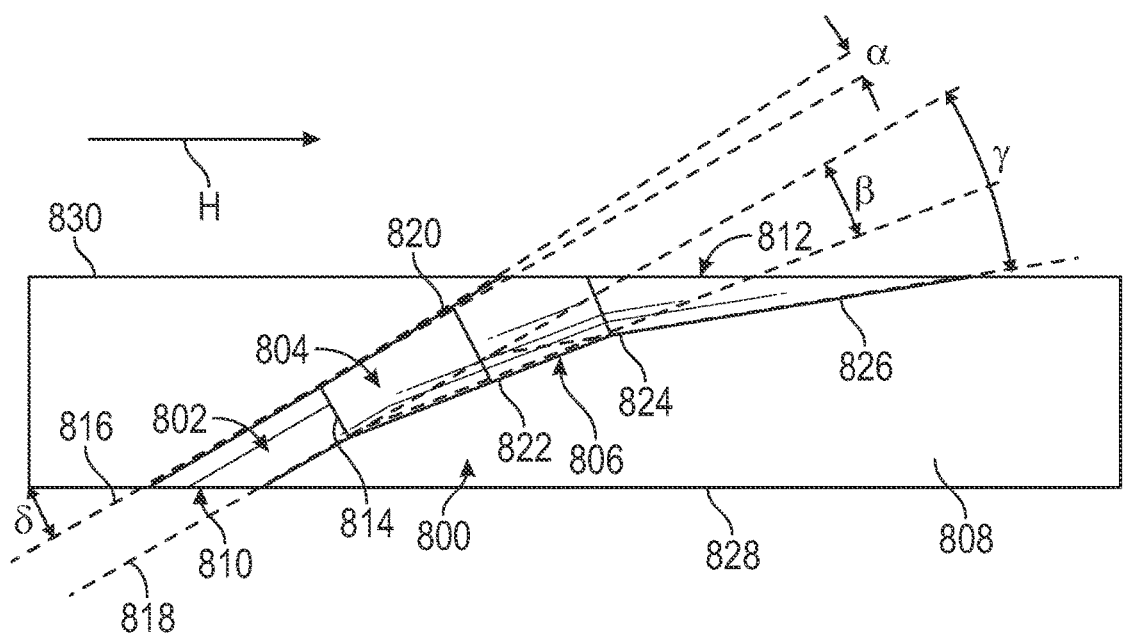
FIG. 8B is a cross section view of the cooling hole shown in FIG. 8A.

Turning now to FIGS. 8A-8B, schematic illustrations of a cooling hole 800 in accordance with an embodiment of the present disclosure are shown. The cooling hole 800 includes a metering section 802 and a diffusing section 804. FIG. 8 is a cross section view through the cooling hole 800 along a ridge surface 806 within the diffusing section 804. The cooling hole 800 defines an aperture or opening through a component wall 808 between an inlet flow plane 810 and an outlet flow plane 812. In FIG. 8, the cooling hole 800 is arranged axially so that a cooling air flows in substantially the same direction longitudinally as high temperature gases flowing along the exterior component wall surface 808 (indicated by arrow H). The ridge surface 806 divides and segregates the two predominantly conical expanding lobe geometries within the first sub-section of the fully covered diffusing section 804. The ridge surface 806 extends from a transition point 814 toward the outlet flow plane 812. The metering section 802 defines two parallel lines, an upper line 816 defined in a flow direction along an upper concave surface of the metering section 802 and a lower line 818 defined in a flow direction along a lower concave surface of the metering section 802.

In some embodiments, a lower single lobe may be illustrated as representative of an aspect of the present disclosure. Such lower single lobe may include concave metering surface, and the transition from a single lobe metering section to a bifurcated conical two lobe diffuser section is achieved, where the maximum apex height and ridge surface 806 monotonically increases to a streamwise location ranging between 10%-50% of the streamwise length of a first fully covered diffusing sub-section, at which point the maximum apex ridge surface 806 height is fully achieved.

The maximum apex or ridge surface 806 height is maintained through the streamwise length of a partially covered diffuser sub-section which is coincident with the exit flow plane of a covered diffuser section. At this location, the apex or ridge surface 806 is monotonically decreasing through the uncovered section of the diffuser, at which point the ridge surface 806 is no longer visible and the lateral surface is relatively planar as it transitions into the flat section component.

Referring to FIGS. 8A-8B and the following description, the angles shown in FIG. 8B are made within the plane defined by the cross-section along the line 8B-8B of FIG. 8A. At the transition point 814 along the upper line 816, where the upper concave surface of the metering section 802 transitions to the diffusing section 804, an upstream diffusing surface 820 of the cooling hole 800 angles away from the upper line 816 at an upstream diffusing angle $\alpha$. At the transition point 814 along the lower line 818, where the lower concave surface of the metering section 802 transitions to the diffusing section 804, a first surface 822 of the ridge surface 806 angles away from the lower line 818 by a first downstream diffusing angle $\beta$. The first surface 822 of the ridge surface 806 that defines the first downstream diffusing angle $\beta$ is along an apex of the ridge surface 806. The first surface 822 of the ridge surface 806 extends at the first downstream diffusing angle $\beta$ to a ridge surface inflection point 824. At the ridge surface inflection point 824 a second surface 826 of the ridge surface 806 extends at a second downstream diffusing angle $\gamma$. The second downstream diffusing angle $\gamma$ is measured relative to the lower line 818.

The component wall 808 has an inner wall surface 828 and an outer wall surface 830. The parallel lower and upper lines 816, 818 are angled at a centerline angle $\delta$ relative to one or both of the inner wall surface 828 and the outer wall surface 830. As such, the upstream diffusing angle $\alpha$, the first downstream diffusing angle $\beta$, and the second downstream diffusing angle $\gamma$ may be made with respect to the centerline angle $\delta$ defined by the metering section 802 of the cooling hole 800.

In some embodiments, the upstream diffusing angle $\alpha$ may be less than either of the first downstream diffusing angle $\beta$ and the second downstream diffusing angle $\gamma$. In one non-limiting example, the upstream diffusing angle $\alpha$ may be about 1°-5°, for example. In some embodiments, the first downstream diffusing angle $\beta$ may be less than the second downstream diffusing angle $\gamma$. For example, in one non-limiting example, the first downstream diffusing angle $\beta$ may be about 5°-15°, for example, and the second downstream diffusing angle $\gamma$ may be about 15°-30°, for example. In some embodiments, the centerline angle $\delta$ may be about 20°-40°, for example.

Figure 9A:
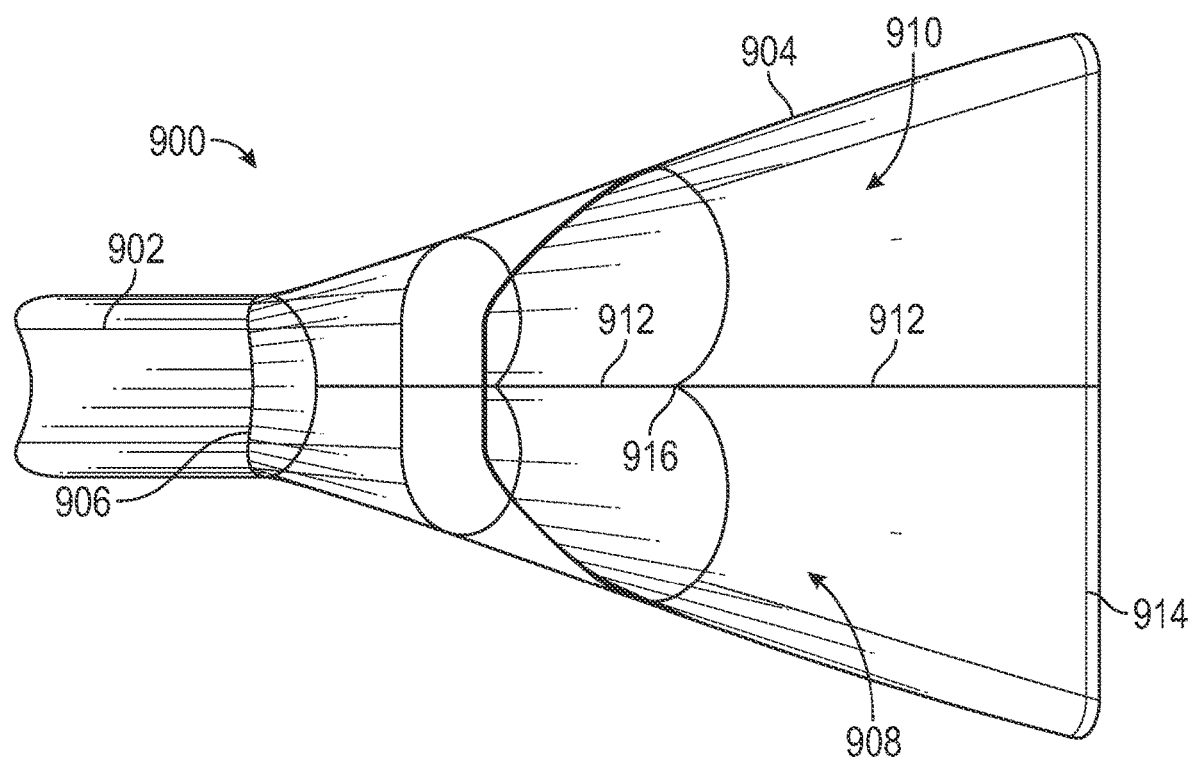
FIG. 9A is a schematic illustration of a portion of a cooling hole in accordance with an embodiment of the present disclosure.
Figure 9B:
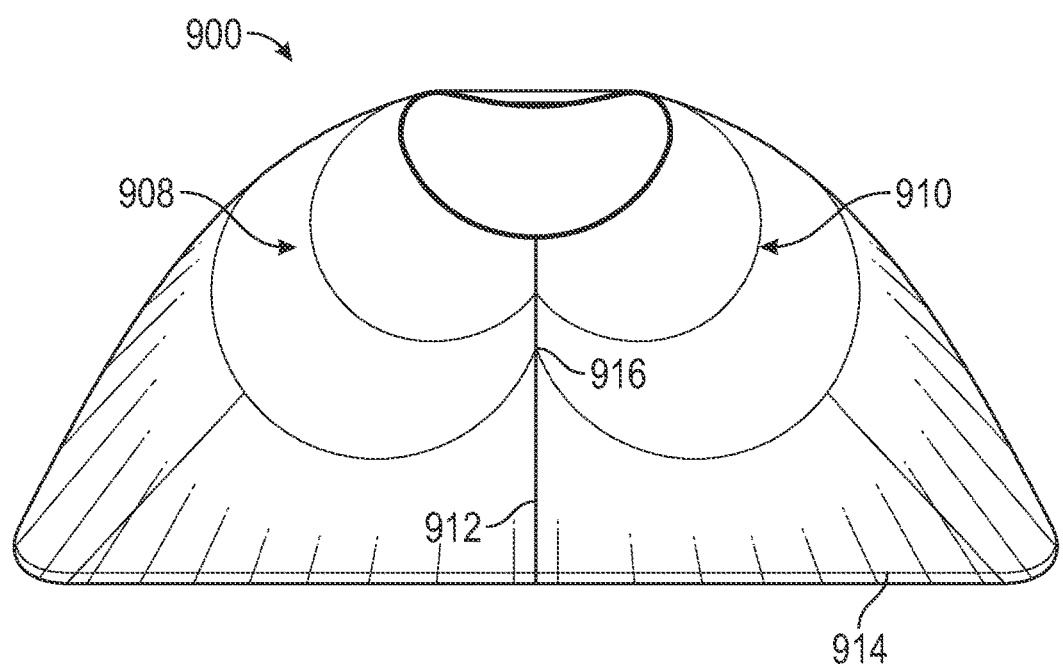
FIG. 9B is an alternative view of the portion of the cooling hole shown in FIG. 9A.

Turning now to FIGS. 9A-9B, schematic illustrations of a portion of a cooling hole 900 in accordance with an embodiment of the present disclosure are shown. In FIGS. 9A-9B, a metering section 902 and a portion of a diffusing section 904 of the cooling hole 900 are illustratively shown. The metering section 902 has a uniform geometry with an upper (top) concave surface and a lower (bottom) concave surface. The metering section 902 extends to a transition plane coincident with point 906 where the cooling hole 900 transitions to the diffusing section 904. The diffusing section 904 includes a first lobe 908 and a second lobe 910 that are separated by a ridge surface 912. Accordingly, at the transition plane coincident with point 906, the cooling hole 900 transitions from a single, uniform geometry defined by the metering section 902 to a two-lobed geometry of the diffusing section 904. The ridge surface 912 originates at the transition plane coincident with point 906 and extends in a line from the transition plane coincident with point 906 to a downstream end of the lobes 908, 910 to a flat surface 914. In some embodiments, the ridge surface 912 may end at a flat portion of the cooling hole 900. The flat surface 914 defines, at least, part of a flat portion of the cooling hole 900.

Each of the lobes 908, 910 define curved surfaces that extend away from the ridge surface 912. The curvature of the lobes 908, 910 at any given streamwise location are predominately conical in shape and may comprise of a single radius and/or comprise of multiple conical features each having a locally unique radius of curvature. As such, the concave surfaces of the conical lobes may not necessarily be entirely cylindrical throughout the entire diffuser section of the cooling hole. Similarly, along the streamwise direction of the cooling airflow, the concave lobe shapes will vary (increase) in radius to accommodate the expansion or diffusion needed to maximize the lateral spreading of the film cooling flow at the exit plane approximate the exterior surface exposed to hot gasses within the freestream. In some alternate embodiments, a single arc of increasing radius in a streamwise direction may be used to define the diffuser lobe geometries, while in other embodiments a lobe geometry may be initially defined by a single arc of constant radius which then may be transitioned in a streamwise direction to lobe shaped geometry comprising of two or more conical features each having unique radii of curvature. The size dependency and transition rates of the various conical lobe geometries may be influenced by local exterior wall thickness distributions, blowing ratio, momentum flux ratio, operating pressure ratio, as well as, local exterior surface curvature, surface angle, hole diameter, cooling airflow, and geometric meter-to-diffuser area ratio and expansion ratio requirements need to achieve the necessary adiabatic film effectiveness levels in order to meet hot section component durability life requirements.

Additionally, there may be geometric manufacturing and producibility constraints and limitations that may also influence how the predominately conical lobe geometries are transitioned through each of the diffusing component sections and sub-sections that comprise the fully covered, partially cover, and uncovered diffuser sections of the film cooling hole. As previously stated, the local radii of curvature will vary in a streamwise direction from the transition plane coincident with point 906 to the flat surface 914 and share a tangency point defined by the ridge surface 912. Each lobe 908, 910 has increasing radii of curvature from the transition plane coincident with point 906 to a ridge surface inflection point 916. From the ridge surface inflection point 916 to the flat surface 914 the radii of curvature of the two lobes 908, 910 increases until each of the lobes 908, 910 transitions into the flat surface 914.

Figure 10:
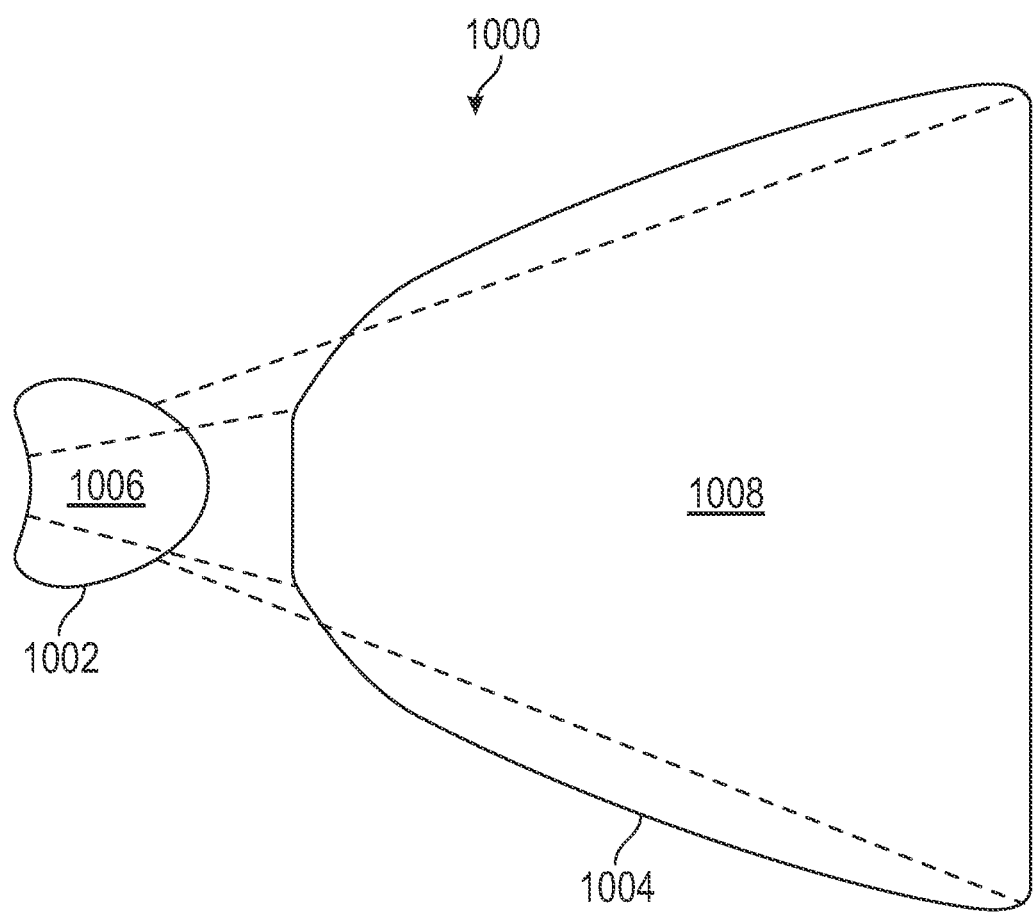
FIG. 10 is a schematic representation of portions of a cooling hole in accordance with an embodiment of the present disclosure.

Turning now to FIG. 10, a schematic representation of a cooling hole 1000 in accordance with an embodiment of the present disclosure is shown. The aspects of the cooling hole 1000 shown in FIG. 10 are the inlet flow plane 1002 and the outlet flow plane 1004. The inlet flow plane 1002 may be formed in an inner wall surface of a component wall and the outlet flow plane 1004 may be formed in an outer wall surface of the component wall. The inlet flow plane 1002 fluidly connects to the outlet flow plane 1004 to define a fluid passage through the component wall. The inlet flow plane 1002 defines a projected inlet area 1006 defining the opening within the respective inner wall surface and the outlet defines an outlet projected area 1008 defining the opening within the respective outer wall surface. The inlet projected area 1006 and the outlet projected area 1008 are representative of a surface area on the respective wall surfaces. In some embodiments the outlet projected area 1008 may be at least between 2 to 12 times the projected inlet area 1006.

Advantageously, embodiments described herein provide for improved cooling schemes for components of gas turbine engines. In accordance with some embodiments, improved cooling hole geometries are provided that increase cooling for components operating in hot sections of gas turbine engines (e.g., airfoils, BOAS, platforms, etc.). In order to mitigate local in-hole vortices as well as improve lateral diffusion of the film cooling flow, geometric concepts that condition the film flow prior to being discharged along the exterior gas path surface of the hot section component are incorporated. Such geometries include lobed sections of a diffusing section of a cooling hole that extend from a metering section to an outlet or flat section at the outlet of the cooling hole. Embodiments of the present disclosure may increase the overall lateral spreading of film cooling flow while mitigating or eliminating local film hole exit flow vortices that promote hot gas entrainment and accelerate film dissipation rates. Accordingly, improved component life and durability may be achieved through incorporate of embodiments of the present disclosure.

As used herein, the terms "about" and "substantially" are intended to include the degree of error associated with measurement of the particular quantity based upon the equipment available at the time of filing the application. For example, the terms "about" and/or "substantially" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A component for a gas turbine engine, the component comprising:
a component wall having an inner wall surface and an outer wall surface; and
a cooling hole formed within the component wall having an inlet formed in the inner wall surface and an outlet formed in the outer wall surface, wherein the cooling hole defines a fluid path through the component wall from the inlet to the outlet, wherein the cooling hole has a metering section extending from the inlet to a transition point and a diffusing section extending from the transition point to the outlet,
wherein the metering section is defined by a uniform geometry,
wherein the diffusing section is defined by a lobed portion that extends from the transition point toward the outlet, the lobed portion being a two-lobed geometry having a first lobe and a second lobe divided by a ridge surface to form two discrete bifurcated diffuser lobes, wherein each discrete bifurcated diffuser lobe defines a continuous surface from the ridge surface to an opposing upper surface of the cooling hole,
wherein each lobe defines continuous curved surfaces along the length of the ridge surface.

2. The component of claim 1, wherein the diffusing section further comprises a flat portion at an end of the ridge surface, wherein each lobe transitions from a curved surface to the flat portion.

3. The component of claim 1, wherein the ridge surface has a first surface extending at a first downstream diffusing angle relative to a centerline defined by the metering section and a second surface extending at a second downstream diffusing angle relative to the centerline, wherein the first surface extends from the transition point to a ridge surface inflection point and the second surface extends from the ridge surface inflection point toward the outlet.

4. The component of claim 3, wherein the second downstream diffusing angle is greater than the first downstream diffusing angle.

5. The component of claim 3, wherein the first downstream diffusing angle is between 5° and 15°.

6. The component of claim 3, wherein the second downstream diffusing angle is between 15° and 30°.

7. The component of claim 1, wherein an upstream diffusing surface of the diffusing section angles away from a centerline defined by the metering section at an upstream diffusing angle.

8. The component of claim 7, wherein the upstream diffusing angle is between 1° and 5°.

9. The component of claim 1, wherein the diffusing section includes a covered region and an uncovered region.

10. The component of claim 9, wherein the covered region includes a fully covered sub-section and a partially covered sub-section, wherein the fully covered sub-section extends from the transition point to an upstream edge of the outlet.

11. The component of claim 1, further comprising a plurality of additional cooling holes arranged in an array of cooling holes.

12. The component of claim 1, wherein the metering section defines a hole centerline angled at a centerline angle of between 20° and 40°.

13. The component of claim 1, wherein the component wall is one of a pressure side wall and a suction side wall of an airfoil.

14. The component of claim 1, wherein the component wall is a platform of a turbine blade.

15. The component of claim 1, wherein the component wall is a platform of a turbine vane.

16. A gas turbine engine comprising:
a compressor section; and
a turbine section;
wherein at least one of the compressor section and the turbine section comprise an airfoil having an airfoil wall having an inner wall surface and an outer wall surface; and
a cooling hole formed within the airfoil wall having an inlet formed in the inner wall surface and an outlet formed in the outer wall surface, wherein the cooling hole defines a fluid path through the airfoil wall from the inlet to the outlet, wherein the cooling hole has a metering section extending from the inlet to a transition point and a diffusing section extending from the transition point to the outlet,
wherein the metering section is defined by a uniform geometry,
wherein the diffusing section is defined by a lobed portion that extends from the transition point toward the outlet, the lobed portion being a two-lobed geometry having a first lobe and a second lobe divided by a ridge surface to form two discrete bifurcated diffuser lobes, wherein each discrete bifurcated diffuser lobe defines a continuous surface from the ridge surface to an opposing upper surface of the cooling hole,
wherein each lobe defines continuous curved surfaces along the length of the ridge surface.

17. The gas turbine engine of claim 16, wherein the diffusing section further comprises a flat portion at an end of the ridge surface, wherein each lobe transitions from a curved surface to the flat portion.

18. The gas turbine engine of claim 16, wherein the ridge surface has a first surface extending at a first downstream diffusing angle relative to a centerline defined by the metering section and a second surface extending at a second downstream diffusing angle relative to the centerline, wherein the first surface extends from the transition point to a ridge surface inflection point and the second surface extends from the ridge surface inflection point toward the outlet.

19. The gas turbine engine of claim 16, wherein an upstream diffusing surface of the diffusing section angles away from a centerline defined by the metering section at an upstream diffusing angle.

20. The gas turbine engine of claim 16, wherein the metering section defines a hole centerline angled at a centerline angle of between 20° and 40°.

* * * * *